US011900171B2

(12) United States Patent
Virdi et al.

(10) Patent No.: US 11,900,171 B2
(45) Date of Patent: Feb. 13, 2024

(54) CLOUD COMPUTING CAPACITY MANAGEMENT SYSTEM USING AUTOMATED FINE-GRAINED ADMISSION CONTROL

(71) Applicant: Microsoft Technology Licensing, LLC, Redmond, WA (US)

(72) Inventors: Gurpreet Virdi, Redmond, WA (US); Fernando Gonzalez Todisco, Bellevue, WA (US); Karthikeyan Subramanian, Redmond, WA (US); Sanjay Ramanujan, Issaquah, WA (US); Sorin Iftimie, Sammamish, WA (US); Xing wen Wang, Redmond, WA (US); Thomas Moscibroda, Bellevue, WA (US); Yunus Mohammed, Redmond, WA (US); Vi Lam Nguyen, Redmond, WA (US); Rostislav Sudakov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 17/165,904

(22) Filed: Feb. 2, 2021

(65) Prior Publication Data

US 2022/0245001 A1 Aug. 4, 2022

(51) Int. Cl.
*G06F 9/50* (2006.01)
*G06F 11/34* (2006.01)

(52) U.S. Cl.
CPC ........... *G06F 9/5072* (2013.01); *G06F 9/505* (2013.01); *G06F 9/5077* (2013.01);
(Continued)

(58) Field of Classification Search
CPC ...... G06F 9/5072; G06F 9/505; G06F 9/5077; G06F 11/3433; G06F 2209/5019; G06F 2209/503
See application file for complete search history.

(56) References Cited

U.S. PATENT DOCUMENTS 8,504,689 B2 * 8/2013 Ferris ................. G06F 11/3006
709/250
10,009,284 B2 * 6/2018 Khan ................... H04L 47/808
(Continued)

OTHER PUBLICATIONS

Carvalho, et al., "Prediction-Based Admission Control for IaaS Clouds with Multiple Service Classes", In Proceedings of the IEEE 7th International Conference on Cloud Computing Technology and Science, Nov. 30, 2015, pp. 82-90.
(Continued)

*Primary Examiner* — Benjamin C Wu
(74) *Attorney, Agent, or Firm* — Ray Quinney & Nebeker; James Bullough

(57) ABSTRACT

A cloud computing capacity management system can include a fine-grained admission control layer, a policy engine, and an enforcement layer. The fine-grained admission control layer can be configured to ingest capacity signals and create a capacity mitigation policy, based at least in part on the capacity signals, to protect available capacity of a cloud computing system for prioritized users. The capacity mitigation policy can be directed to users of the cloud computing system. The policy engine can be configured to control how the capacity mitigation policy is applied to the cloud computing system. The enforcement layer can be configured to handle incoming resource requests and to enforce resource limits based on the capacity mitigation policy as applied by the policy engine.

19 Claims, 9 Drawing Sheets

(52) U.S. Cl.
CPC .... *G06F 11/3433* (2013.01); *G06F 2209/503* (2013.01); *G06F 2209/505* (2013.01); *G06F 2209/5019* (2013.01)

(56) References Cited

U.S. PATENT DOCUMENTS

| | | | | |
|---|---|---|---|---|
| 10,324,765 | B2* | 6/2019 | Greeff | G06F 9/5077 |
| 2014/0310401 | A1* | 10/2014 | Thomas | H04L 47/70 |
| | | | | 709/224 |
| 2014/0359113 | A1* | 12/2014 | Krebs | H04L 41/5009 |
| | | | | 709/224 |
| 2015/0052250 | A1* | 2/2015 | Doganata | H04L 47/78 |
| | | | | 709/226 |
| 2015/0067172 | A1* | 3/2015 | Ashokan | H04L 67/101 |
| | | | | 709/226 |
| 2017/0339243 | A1* | 11/2017 | Balafoutis | H04L 67/561 |
| 2019/0166518 | A1 | 5/2019 | Arora et al. | |
| 2020/0285525 | A1 | 9/2020 | Agarwal et al. | |
| 2020/0334088 | A1* | 10/2020 | Casillas | G06F 9/5072 |
| 2020/0387401 | A1* | 12/2020 | Zhou | H04L 41/0893 |
| 2021/0144517 | A1* | 5/2021 | Guim Bernat | H04L 67/10 |
| 2021/0174281 | A1* | 6/2021 | Bhaskara | G06F 11/3433 |
| 2022/0100573 | A1* | 3/2022 | Allen | G06F 9/5077 |
| 2022/0206873 | A1* | 6/2022 | He | G06F 9/4881 |
| 2022/0327002 | A1* | 10/2022 | Yang | G06F 9/5038 |

OTHER PUBLICATIONS

"International Search Report and Written Opinion Issued in PCT Application No. PCT/US2022/012842", dated May 10, 2022, 15 Pages.

* cited by examiner

CLOUD COMPUTING CAPACITY MANAGEMENT SYSTEM USING AUTOMATED FINE-GRAINED ADMISSION CONTROL

CROSS-REFERENCE TO RELATED APPLICATIONS

N/A

BACKGROUND

Cloud computing is the delivery of computing services over the internet. Some examples of computing services that can be provided by a cloud computing system include storage, databases, networking, software, and analytics. The use of cloud computing technology has grown rapidly in recent years, due at least in part to the development of high-capacity networks as well as relatively low-cost computers and storage devices.

Broadly speaking, a cloud computing system includes two sections, a front end and a back end, that are in communication with one another via the internet. The front end includes the user interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the internet.

There are many different types of services that cloud computing providers can offer to customers. One type of cloud computing service is referred to as Infrastructure as a Service (IaaS). IaaS is a form of cloud computing that delivers compute, network, and storage resources to consumers on-demand, over the internet.

In a typical IaaS scenario, customers rent the use of resources offered by the cloud computing provider. For example, customers can rent the use of virtual machines that run on servers maintained by the cloud computing provider. In this context, the term "server" refers to a physical computer system, while the term "virtual machine" refers to an emulation of a computer system on a server. In other words, a virtual machine is a program running on a server that acts like a virtual computer. Like a physical computer, a virtual machine runs an operating system and one or more applications.

IaaS enables end users to scale a cloud computing system's resources on an as-needed basis, reducing the need for large, up-front capital expenditures. With most public cloud computing providers, users can choose to scale resources up or down. An example of scaling resources up involves utilizing more powerful virtual machines, whereas an example of scaling resources down involves utilizing less powerful virtual machines. Users can also choose to scale resources in or out. An example of scaling resources in involves utilizing fewer virtual machines, whereas an example of scaling resources out involves utilizing more virtual machines.

The ability to scale a cloud computing system's resources on an as-needed basis can be beneficial for users who anticipate having variable workloads. However, it can be quite challenging for the operator of a cloud computing system to provide this capability to users. Although cloud computing providers attempt to offer service elasticity to meet any shape and form of user demand, the capacity of a cloud computing system is not infinite, and the resources offered by a cloud computing system are shared among a large number of users. Moreover, due to the way that modern software services are designed and deployed, they can instantaneously grow or shrink in size. This means that the demand for the resources of a cloud computing system can change dramatically within a brief period of time. In addition, changes to the supply side are also possible. Although most cloud computing providers have established supply chains, unexpected events can sometimes cause disruptions that stall the delivery of hardware or affect the hardware that is currently in their datacenters.

Benefits may be realized by techniques that enable cloud computing providers to address at least some of these issues. For example, benefits may be realized by techniques that enable cloud computing providers to effectively manage large variations in demand for cloud computing services, and to bridge the gap between the ever-changing demand and supply.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

In accordance with one aspect of the present disclosure, a cloud computing capacity management system is disclosed that includes one or more processors. The cloud computing capacity management system also includes a fine-grained admission control layer that is executable by the one or more processors to ingest capacity signals and create a capacity mitigation policy, based at least in part on the capacity signals, to protect available capacity of a cloud computing system for prioritized users. The capacity mitigation policy is directed to users of the cloud computing system at a subscription level. The cloud computing capacity management system also includes a policy engine that is executable by the one or more processors to control how the capacity mitigation policy is applied to the cloud computing system in order to cause one or more capacity mitigation actions to be performed when capacity shortages are predicted and to undo the one or more capacity mitigation actions when the capacity shortages are no longer predicted. The cloud computing capacity management system also includes an enforcement layer that is executable by the one or more processors to handle incoming resource requests and to enforce resource limits based on the capacity mitigation policy as applied by the policy engine.

The capacity signals may include a predicted deployed resources signal that includes a plurality of different resource usage predictions corresponding to a plurality of different deployment grains. A resource usage prediction for a deployment grain may predict an amount of cloud computing resources that will be consumed by the deployment grain in an upcoming time period. The capacity signals may also include a capacity constrained regions signal that identifies regions of the cloud computing system where demand is expected to exceed capacity at a future point in time.

At least some of the plurality of different deployment grains may correspond to a same subscription for the cloud computing system.

The resource usage prediction for the deployment grain may be generated based on historical data about cloud computing resources that have been consumed by that deployment grain in the past.

The capacity constrained regions signal may include exhaustion metrics that indicate how much time remains before demand exceeds capacity in various geographical regions of the cloud computing system.

The capacity signals may include a capacity constrained regions signal that identifies regions of the cloud computing system where demand is expected to exceed capacity at a future point in time. The fine-grained admission control layer may create the capacity mitigation policy based at least in part on the capacity constrained regions signal.

The fine-grained admission control layer may create the capacity mitigation policy in response to detecting that a predicted demand for cloud computing resources in a geographical region of the cloud computing system exceeds a predicted available capacity for that geographical region of the cloud computing system during an upcoming time period.

The capacity signals may include a plurality of different resource usage predictions corresponding to a plurality of different deployment grains. A resource usage prediction for a deployment grain may predict an amount of cloud computing resources that will be consumed by the deployment grain in an upcoming time period. The capacity mitigation policy may include usage restrictions based on the resource usage predictions. The usage restrictions may include thresholds for limiting usage of deployment grains when the cloud computing system is experiencing capacity shortages. A usage restriction corresponding to a particular deployment grain may include a limit on the usage of the particular deployment grain based at least in part on the resource usage prediction that has been calculated for the particular deployment grain.

The fine-grained admission control layer may create the capacity mitigation policy based at least in part on a predicted capacity effect that predicts how the capacity mitigation policy will affect a predicted available capacity of the cloud computing system and a predicted user effect that predicts how the capacity mitigation policy will affect at least some of the users of the cloud computing system.

The capacity mitigation policy may include a plurality of different capacity mitigation actions that are applied to different segments of the cloud computing system.

The capacity mitigation policy may include a plurality of capacity mitigation actions. The fine-grained admission control layer may determine, for each capacity mitigation action, a segment of the cloud computing system to which the capacity mitigation action should be applied, a cost of the capacity mitigation action, and an effect of the capacity mitigation action on the available capacity of the cloud computing system.

The policy engine may be additionally executable by the one or more processors to obtain a current set of capacity mitigation actions and a current predicted available capacity and subtract effects of the current set of capacity mitigation actions from the current predicted available capacity to produce a new predicted available capacity. The policy engine may be additionally executable by the one or more processors to, when the new predicted available capacity exceeds a predicted demand, remove existing capacity mitigation actions. The policy engine may be additionally executable by the one or more processors to, when the predicted demand exceeds the new predicted available capacity, add new capacity mitigation actions based on the capacity mitigation policy until the new predicted available capacity exceeds the predicted demand.

The cloud computing capacity management system may further include a plurality of fine-grained admission control layers that are replicated across a plurality of different geographical regions.

The cloud computing capacity management system may further include a prediction engine that is configured to generate the capacity signals and at least one manual override lever for managing extraneous situations outside of intelligence provided by the prediction engine.

The capacity signals may include a predicted deployed resources signal that includes a plurality of different resource usage predictions corresponding to a plurality of different deployment grains. The fine-grained admission control layer may create the capacity mitigation policy based at least in part on a cached version of the predicted deployed resources signal.

In accordance with another aspect of the present disclosure, a method is disclosed for automated fine-grained admission control for a cloud computing system. The method includes obtaining a predicted deployed resources signal that includes a plurality of different resource usage predictions corresponding to a plurality of different deployment grains. A resource usage prediction for a deployment grain predicts an amount of cloud computing resources that will be consumed by the deployment grain in an upcoming time period. The method further includes obtaining a capacity constrained regions signal that identifies regions of the cloud computing system where demand is expected to exceed capacity at a future point in time. The method further includes creating a capacity mitigation policy based at least in part on the predicted deployed resources signal and the capacity constrained regions signal. The capacity mitigation policy protects available capacity of the cloud computing system for prioritized users. The method further includes enforcing resource limits against incoming resource requests based on the capacity mitigation policy.

The resource usage prediction for the deployment grain may be generated based on historical data about cloud computing resources that have been consumed by that deployment grain in the past.

The capacity mitigation policy may be created in response to detecting, based at least in part on the capacity constrained regions signal, that a predicted demand for cloud computing resources in a geographical region of the cloud computing system exceeds a predicted available capacity for that geographical region of the cloud computing system during an upcoming time period.

The capacity mitigation policy may include a plurality of different capacity mitigation actions that are applied to different segments of the cloud computing system.

In accordance with another aspect of the present disclosure, a computer-readable medium is disclosed that includes instructions that are executable by one or more processors to cause a computing system to receive, at an enforcement layer of a cloud computing system, a first request to deploy first cloud computing resources for a first subscription corresponding to the cloud computing system. The instructions are also executable by one or more processors to cause a computing system to receive, at the enforcement layer of the cloud computing system, a second request to deploy second cloud computing resources for a second subscription corresponding to the cloud computing system. The instructions are also executable by one or more processors to cause a computing system to fetch at least one capacity mitigation policy from a policy engine of the cloud computing system. The capacity mitigation policy protects available capacity of the cloud computing system for prioritized users. The capacity mitigation policy includes at least one capacity mitigation action that affects the first subscription. The capacity mitigation policy does not include any capacity mitigation actions that affect the second subscription. The instructions are also executable by one or more processors to cause a computing system to decline the first request based on the capacity mitigation policy by refusing to deploy the first cloud computing resources. The instructions are also executable by one or more processors to cause a computing system to approve the second request based on the capacity mitigation policy by deploying the second cloud computing resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
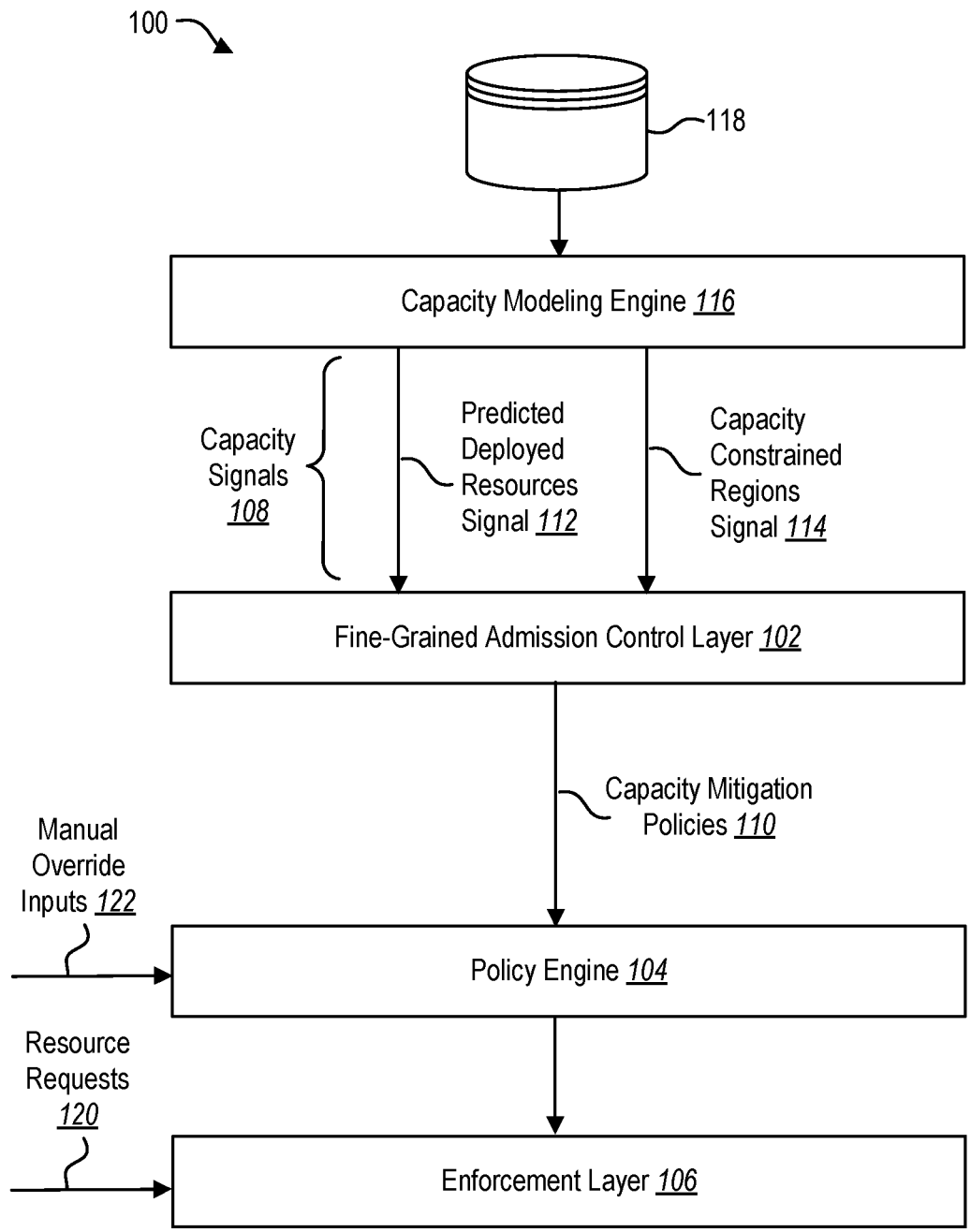
FIG. 1 illustrates an example of a capacity management system for a cloud computing system in accordance with at least some embodiments of the present disclosure.

The present disclosure is generally related to a capacity management system for a cloud computing system. A capacity management system as disclosed herein can utilize fine-grained differentiation to provide a cloud computing provider with a greater degree of granularity for managing capacity than is available with known approaches.

When the demand for the resources of a cloud computing system exceeds the cloud computing system's capacity, restrictions are typically applied to reduce the demand. For example, requests for additional compute resources can be denied. With current approaches, such restrictions are typically applied in a way that fails to take into consideration differences between the various users of the cloud computing system. For example, although restrictions can be applied to an entire geographical region, there is currently no mechanism for applying different restrictions to different users within that geographical region. Therefore, all of the users who are consuming resources provided by the datacenters in that geographical region can be affected by the restrictions, regardless of the differences that can exist between those users. Manual steps can be taken to loosen restrictions in a reactive manner as the capacity situation improves, but this is a crude and inefficient way to distinguish between different users.

In contrast to known approaches, the techniques disclosed herein can take into consideration various information about the users of a cloud computing system (e.g., differences in workload patterns, relative priority, how much they will be affected by the restrictions) when applying restrictions to reduce demand for a cloud computing system's resources. The disclosed techniques can also take into consideration the dynamic demand and capacity situation of the cloud computing system itself. This makes it possible for cloud computing providers to apply restrictions in a much more intelligent and precise manner than is possible with current approaches.

Many cloud computing systems enable users (e.g., customers) to have a plurality of subscriptions. For example, users can be permitted to have N subscriptions, where the value of N can be any positive integer. The ability to have a plurality of subscriptions can be beneficial because this allows customers to better manage their workloads and costs. In accordance with at least some embodiments of the present disclosure, a cloud computing capacity management system can be configured to consume one or more capacity health signals, compute resource usage predictions for each user at a subscription level, and enforce limits (when appropriate, such as when capacity shortages exist) so there are no additional resources consumed beyond what is determined to be allowable. A cloud computing capacity management system as disclosed herein can be fine-grained to target specific users' subscriptions and can provide admission control to protect available capacity for high priority users seeking compute resources in a specific geographical region. A cloud computing capacity management system as disclosed herein can learn from prior deployments to understand deployment patterns and can predict a compute resource threshold that can be used to manage admission control. A cloud computing capacity management system as disclosed herein can determine how to prioritize capacity going forward. A cloud computing capacity management system as disclosed herein can estimate cloud computing resources (e.g., cores) being protected and based on those estimates create policies to protect resources for prioritized capacity for high priority services and/or users. A cloud computing capacity management system as disclosed herein can utilize data at scale and enforce these limits. Feedback and monitoring telemetry can be provided to allow cloud computing providers to view and consider system performance and user experience on an ongoing basis to determine these limits.

One significant benefit of the techniques disclosed herein is the fact that the resources of a cloud computing system can be protected for high-priority users. The recent COVID-19 crisis illustrates the importance of this benefit. Toward the beginning of the COVID-19 crisis, as more and more people started to work from home, demand for cloud computing resources surged. This placed tremendous strain on many cloud computing systems, and demand exceeded capacity in some cases. As cloud computing providers grappled with how to cope with the surge in demand, it was generally recognized that available resources should be prioritized for first responders. However, the capacity management techniques that existed at that time did not provide an efficient way for doing this. The techniques disclosed herein solve this problem by making it possible to easily and efficiently distinguish between different types of users and thereby protect the available capacity of a cloud computing system for prioritized users.

A cloud computing capacity management system as disclosed herein can be configured to make decisions about resource requests very quickly (e.g., milliseconds). This is extremely challenging in view of the massive amounts of data that are analyzed to make the predictions and determinations described herein. Advantageously, the architecture of the cloud computing capacity management system as disclosed herein is designed to reduce processing and memory requirements and thereby enable rapid decision making. For example, as will be described in greater detail below, resource request datasets can be cached. In addition, in some embodiments, other information that is relied on to make decisions about capacity mitigation actions can also be cached. This enables decisions that are based on voluminous amounts of data to be made quickly.

FIG. 1 illustrates an example of a capacity management system 100 for a cloud computing system in accordance with at least some embodiments of the present disclosure. The cloud computing capacity management system 100 can include a fine-grained admission control layer 102, a policy engine 104, and an enforcement layer 106.

The fine-grained admission control layer 102 can be configured to ingest capacity signals 108 and create one or more capacity mitigation policies 110 based at least in part on the capacity signals 108. The capacity mitigation policies 110 can be designed to protect available capacity of the cloud computing system for prioritized users. The capacity mitigation policies 110 can be directed to users of the cloud computing system at a subscription level.

In this context, the term "subscription" can refer to a logical entity that can deploy and/or consume services provided by a cloud computing system. In contrast, the term "user" can refer to an actual, real-world entity (e.g., a company, a person) who deploys and/or consumes cloud computing services. A user can be associated with a plurality of different subscriptions.

The term "subscription level" indicates a level of granularity at which a capacity mitigation policy 110 can be applied. In some embodiments, a capacity mitigation policy 110 is directed to users at a subscription level if different capacity mitigation actions (e.g., usage restrictions) can be applied to different subscriptions corresponding to the same user. For example, suppose that a particular user has two subscriptions, which will be referred to as subscription A and subscription B. If the capacity mitigation actions that are applied to subscription A based on a particular capacity mitigation policy 110 can be different from the capacity mitigation actions that are applied to subscription B based on the same capacity mitigation policy 110, then this means that the capacity mitigation policy 110 can be applied at a subscription level.

In some embodiments, the capacity signals 108 that are ingested by the fine-grained admission control layer 102 can include at least two different types of signals. A first type of signal can include a prediction of how many cloud computing resources will be consumed by various deployment grains (as that term is defined below) during an upcoming time period. This first type of signal may be referred to herein as a predicted deployed resources signal 112. A second type of signal can identify regions of the cloud computing system where demand is expected to exceed capacity (or at least come close to exceeding capacity) at a future point in time. This second type of signal may be referred to herein as a capacity constrained regions signal 114.

FIG. 1 shows the cloud computing capacity management system 100 with a capacity modeling engine 116 that can be configured to analyze data contained in one or more data stores 118 in order to generate the capacity signals 108. Because a cloud computing system can have an extremely large number (e.g., millions) of users deploying many distinct types of cloud computing resources (e.g., distinct types of virtual machines) across many different geographical regions, the dataset that is used to generate the capacity signals 108 can be extremely large. In some embodiments, the data that is analyzed to generate the capacity signals 108 can include datasets from resource requests that have been submitted by users to the cloud computing system. These resource request datasets can be cached in one or more data stores 118 and enriched with cloud telemetry and data assets.

The fine-grained admission control layer 102 can create one or more capacity mitigation policies 110 and provide the capacity mitigation policies 110 to the policy engine 104. In some embodiments, the fine-grained admission control layer 102 can provide one or more capacity mitigation policies 110 to the policy engine 104 whenever the capacity constrained regions signal 114 indicates that demand is expected to exceed available capacity in one or more geographical regions of the cloud computing system.

The policy engine 104 can be configured to control how the capacity mitigation policies 110 are applied to the cloud computing system. The capacity mitigation policies 110 can include one or more capacity mitigation actions. The policy engine 104 can apply the capacity mitigation policy 110 to the cloud computing system so as to cause some or all of the capacity mitigation actions to be performed when capacity shortages are predicted to occur and to cause the capacity mitigation actions to be undone when the capacity shortages are no longer predicted to occur. In this context, the term "capacity mitigation action" can refer to any action that has the effect of partially or fully alleviating a shortage of capacity for the cloud computing system's resources, or that is intended to cause such an effect. The term "capacity mitigation policy" can refer to any policy that is implemented by a cloud computing system in order to control the types of capacity mitigation actions that are performed.

In other words, the fine-grained admission control layer 102 can be configured to define a set of rules that intelligently protects cloud computing resources for high-priority users and/or subscriptions. These rules form one or more capacity mitigation policies 110. The policy engine 104 decides which rules should be applied and when those rules should be applied. Aspects of various examples of a mitigation algorithm that the policy engine 104 can use to make such decisions will be described below.

In some embodiments, one or more components of the cloud computing capacity management system 100 can be replicated across a plurality of different geographical regions. For example, the fine-grained admission control layer 102 can be replicated across a plurality of different geographical regions. This enables decentralized decision making as allocations can occur worldwide.

The enforcement layer 106 can be configured to handle incoming resource requests 120 and to enforce resource limits based on the capacity mitigation policies 110 as applied by the policy engine 104. When a user wants to deploy cloud computing resources, the user can submit a resource request 120 to the cloud computing system. The resource request 120 can be submitted via a user interface of the cloud computing system, which the user can access through a client device. In response to receiving such a resource request 120, the enforcement layer 106 can interact with the policy engine 104 to determine whether fulfilling the resource request 120 is consistent with the capacity mitigation policies 110 that are currently in effect.

Depending on the capacity mitigation actions that are being taken in accordance with the capacity mitigation policies 110 that are currently in effect, the enforcement layer 106 may decide that one or more actions should be taken in response to the user's resource request 120. Some examples of actions that could be taken by the enforcement layer 106 include the following: deciding that the fulfillment of the user's resource request 120 should be delayed; queuing the incoming resource request 120, so that the fulfillment of the resource request 120 is delayed until higher priority resource requests 120 have been fulfilled; blocking the incoming resource request 120 altogether; routing one or more deployments to other geographical regions that have higher available capacity; scheduling deployments to occur over a different time window that is noncompeting; fulfilling deployments with alternate cloud computing resources; causing deployments to utilize other features of the cloud computing system such as low priority workloads (namely, workloads that run at a much lower cost to the customer but without a guaranteed level of service, and which can be bumped off when high-priority workloads arrive); and causing deployments to be oversubscribed so that the underlying physical resources can be utilized at a higher potential. For subscriptions that fall within the scope of admission control, a suitable message can be shown to the user underscoring the reason for the limitation(s) on resource usage and providing one or more alternatives listed above.

Under some circumstances, at least some aspects of the techniques disclosed herein can occur automatically. For example, historical data can be analyzed and capacity mitigation policies 110 can be automatically created based on that analysis. However, some users' capacity needs can change unexpectedly, in various ways that currently known prediction models are not able to predict effectively. Thus, a cloud computing capacity management system 100 as disclosed herein can include the ability to enable at least some decisions about mitigation actions to be changed via manual input by authorized users (e.g., system administrators). In other words, a cloud computing capacity management system 100 as disclosed herein can include manual override levers as well, thereby enabling additional granularity with respect to blocking and allowing resource consumption by users of the cloud computing system. The manual override levers can make it possible to manage extraneous situations outside of the intelligence provided by the capacity signals 108. For example, manual override levers can be used to increase capacity for first responders in a pandemic.

To illustrate this feature of the cloud computing capacity management system 100, FIG. 1 shows manual override inputs 122 being provided to the policy engine 104. However, in alternative embodiments the manual override inputs 122 can be provided to other components of the cloud computing capacity management system 100, including the fine-grained admission control layer 102 and/or the enforcement layer 106. The policy engine 104 (or other component of the cloud computing capacity management system 100) can be configured to adjust one or more aspects of the capacity mitigation policies 110 that are in effect based at least in part on the manual override inputs 122.

The cloud computing capacity management system 100 shown in FIG. 1 incorporates an understanding of the users of a cloud computing system, their workload patterns, the dynamic demand for cloud computing resources, and the dynamic capacity of the cloud computing system itself to make decisions about whether to allow or disallow requests 120 for cloud computing resources. This provides several benefits for cloud computing providers. For example, the cloud computing capacity management system 100 provides the ability to prioritize growth for an existing user's subscription based on usage history and to ensure that high-priority users and subscriptions receive needed resources. The cloud computing capacity management system 100 also provides the ability to precisely limit growth for subscriptions in capacity constrained regions by determining thresholds while protecting resources for prioritized users. In some embodiments, the cloud computing capacity management system 100 can also provide the ability to streamline an eviction process by incorporating granular controls while giving the ability to grant access at a fine-controlled subscription level.

Figure 2:
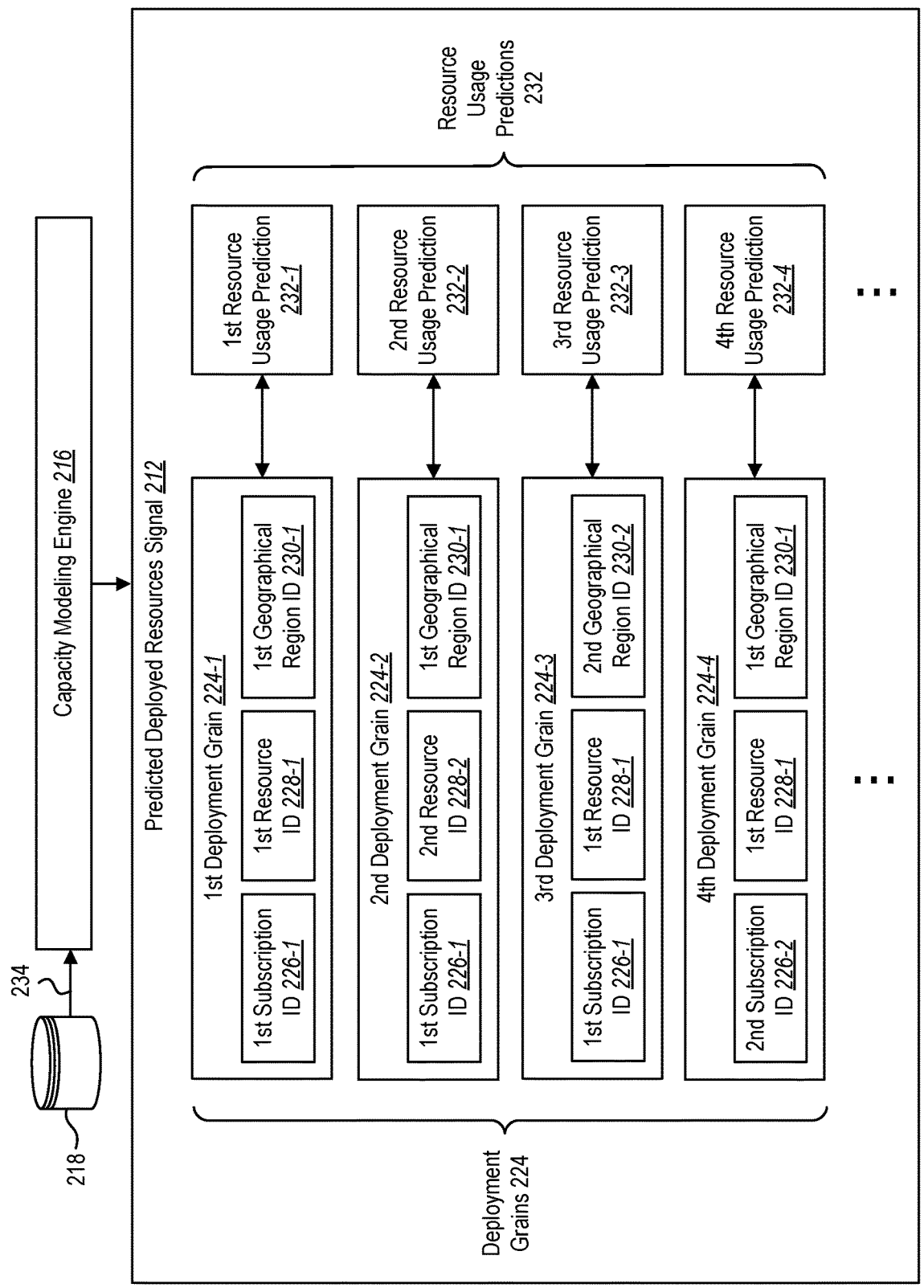
FIG. 2 illustrates an example of a predicted deployed resources signal in accordance with at least some embodiments of the present disclosure.

FIG. 2 illustrates an example of a predicted deployed resources signal 212 in accordance with at least some embodiments of the present disclosure. As noted above, a predicted deployed resources signal 212 can include a prediction about how many cloud computing resources will be consumed by various deployment grains 224 during an upcoming time period.

In this context, the term "deployment grain" 224 can refer to a logical unit of a cloud computing system's resources that can be deployed by a particular subscription. In some embodiments, a deployment grain 224 can correspond to a particular type of resource that can be deployed by a particular subscription in a particular geographical region. In the example shown in FIG. 2, a deployment grain 224 is depicted as including a combination of a subscription ID, a resource ID, and a geographical region ID. A subscription ID can uniquely identify a subscription associated with the cloud computing system. A resource ID can uniquely identify a type of resource (e.g., a type of virtual machine) that can be deployed by the cloud computing system. A geographical region ID can uniquely identify a geographical region or zone in which the cloud computing system has physical computing resources on which the cloud computing resources can be deployed.

An example of a resource ID is a virtual machine ID (e.g., a virtual machine stock-keeping unit (SKU)). In some cloud computing systems it can be possible to deploy a plurality of different types of virtual machines. Certain types of virtual machines can be more powerful than others. For example, certain types of virtual machines can include a faster processor and/or more memory than others. A virtual machine ID can uniquely identify a type of virtual machine that can be deployed by the cloud computing system.

Many different deployment grains 224 can be defined for a cloud computing system. In some embodiments, there can be at least one deployment grain 224 defined for each subscription. In addition, at least some of the subscriptions can have a plurality of different deployment grains 224, because a single subscription can deploy different types of cloud computing resources.

A few examples of deployment grains 224 are shown in FIG. 2. A first deployment grain 224-1, a second deployment grain 224-2, and a third deployment grain 224-3 are each associated with a first subscription ID 226-1. The first deployment grain 224-1 is associated with a first resource ID 228-1 and a first geographical region ID 230-1. The second deployment grain 224-2 is associated with a second resource ID 228-2 and the first geographical region ID 230-1. The third deployment grain 224-3 is associated with the first resource ID 228-1 and a second geographical region ID 230-2. A fourth deployment grain 224-4 is associated with a second subscription ID 226-2, the first resource ID 228-1, and the first geographical region ID 230-1.

The predicted deployed resources signal 212 includes resource usage predictions 232 corresponding to a plurality of different deployment grains 224. In some embodiments, the resource usage predictions 232 can be considered to be thresholds that can be used for limiting the usage of particular subscriptions when the cloud computing system is experiencing capacity shortages. As will be described in greater detail below, in response to capacity shortages the resource usage of certain subscriptions can be limited based at least in part on the resource usage predictions 232 that have been calculated for those subscriptions. Thus, the resource usage predictions 232 can be thought of as thresholds that represent an upper bound on permitted resource usage when available capacity is scarce.

For the sake of simplicity, the predicted deployed resources signal 212 shown in FIG. 2 includes only a few resource usage predictions 232 corresponding to a few deployment grains 224. However, a predicted deployed resources signal 212 in accordance with the present disclosure can include a very large numbers of resource usage predictions 232 corresponding to a very large number of deployment grains 224. In a typical public cloud computing system, there can be a very large number (e.g., millions) of customers deploying a large number of subscriptions for many distinct types of resources (e.g., virtual machines) across many different geographical regions. As a result, incoming datasets can be extremely large. The predicted deployed resources signal 212 can scale with an extremely large volume of time series, and can be a dynamically generated signal based on the desired prediction window.

In some embodiments, one or more versions of the predicted deployed resources signal 212 can be generated in advance of being needed by the fine-grained admission control layer 102. These versions of the predicted deployed resources signal 212 can be cached, and the fine-grained admission control layer 102 can generate capacity mitigation policies 110 based at least in part on the cached versions of the predicted deployed resources signal 212. This enables decisions that are based on voluminous amounts of data to be made quickly, as discussed above. Cached versions of the predicted deployed resources signal 212 can correspond to different time periods, different combinations of deployment grains 224, different geographical regions, and the like.

As the examples shown in FIG. 2 demonstrate, a predicted deployed resources signal 212 can include resource usage predictions 232 for a plurality of different deployment grains 224 corresponding to a plurality of different subscriptions. In particular, the predicted deployed resources signal 212 shown in FIG. 2 includes resource usage predictions 232 for deployment grains 224 corresponding to a first subscription ID 226-1 and a second subscription ID 226-2.

The examples shown in FIG. 2 also illustrate that the same subscription can be associated with a plurality of different deployment grains 224. In particular, the first subscription ID 226-1 is associated with the first deployment grain 224-1, the second deployment grain 224-2, and the third deployment grain 224-3.

The examples shown in FIG. 2 also illustrate that the deployment grains 224 corresponding to the same subscription can be associated with different deployed resources and/or different geographical regions. In particular, as noted above, the first deployment grain 224-1, the second deployment grain 224-2, and the third deployment grain 224-3 are each associated with the first subscription ID 226-1. These deployment grains 224 are associated with different deployed resources and/or different geographical regions. In particular, the first deployment grain 224-1 is associated with a first resource ID 228-1 and a first geographical region ID 230-1, the second deployment grain 224-2 is associated with a second resource ID 228-2 and the first geographical region ID 230-1, and the third deployment grain 224-3 is associated with the first resource ID 228-1 and a second geographical region ID 230-2.

The examples shown in FIG. 2 also illustrate that a distinct resource usage prediction 232 can be associated with each of the deployment grains 224 in the predicted deployed resources signal 212. In particular, the first deployment grain 224-1 is associated with a first resource usage prediction 232-1, the second deployment grain 224-2 is associated with a second resource usage prediction 232-2, the third deployment grain 224-3 is associated with a third resource usage prediction 232-3, and the fourth deployment grain 224 is associated with a fourth resource usage prediction 232-4. The resource usage prediction 232 associated with a particular deployment grain 224 can include a prediction about how many cloud computing resources will be consumed by that deployment grain 224 during an upcoming time period.

For the sake of simplicity, the predicted deployed resources signal 212 shown in FIG. 2 only includes a few resource usage predictions 232 corresponding to a few different deployment grains 224. However, because a cloud computing system can have an extremely large number (e.g., millions) of customer subscriptions deploying many distinct types of cloud computing resources (e.g., distinct types of virtual machines) across many different geographical regions, a predicted deployed resources signal 212 in accordance with the present disclosure can include a very large number of resource usage predictions 232 corresponding to a very large number of deployment grains 224.

There are a variety of different ways that the resource usage predictions 232 can be expressed. In some embodiments, resource usage predictions 232 can be expressed in terms of physical and/or virtual central processing unit (CPU) cores that are expected to be consumed. As another example, resource usage predictions 232 can be expressed in terms of one or more metrics that are designed to indicate memory and/or storage requirements.

In some embodiments, the resource usage prediction 232 corresponding to a particular deployment grain 224 can be generated based on historical data 234 about cloud computing resources that have been consumed by that particular deployment grain 224 in the past. The resource usage prediction 232 can be dynamically generated for a particular upcoming time period. The upcoming time period can be expressed in terms of any suitable time interval (e.g., minutes, hours, weeks, months). Time series-based forecasts can be used to determine the amount of cloud computing resources that are expected to be consumed during the upcoming time period.

The resource usage prediction 232 corresponding to a particular deployment grain 224 can be generated based on many different factors. Some examples of factors that can be taken into consideration include the following: whether the subscription has recently deployed cloud computing resources; whether the subscription is an ongoing subscription that is actively consuming cloud computing resources, or whether the subscription is an infrequent subscription; whether the subscription has been in a steady state and deploying a similar volume of cloud computing resources during a recent time period; whether the subscription has experienced significant growth in terms of resource consumption during a recent time period; and whether the cloud computing resources being deployed are regularly scaled (in or out, up or down) so that the amount of cloud computing resources are elastic in nature.

In some embodiments, anomaly detection algorithms can be utilized to determine whether certain subscriptions are growing massively and are likely to get unbounded unless restrictions are applied. When such subscriptions are identified, this can be reported to the fine-grained admission control layer 102.

In some embodiments, the manner in which deployment of cloud computing resources has varied across different time periods in the past can be taken into consideration when generating a resource usage prediction 232 for an upcoming time period. For example, suppose that a particular deployment grain 224 has, in the past, experienced significantly greater resource consumption during regular business hours than it has during nighttime hours. In this case, the resource usage prediction 232 that is generated for the deployment grain 224 can differ greatly depending on whether the upcoming time period occurs during business hours or at nighttime. As another example, suppose that a particular deployment grain 224 has, in the past, experienced significantly less resource consumption during certain months of the year (e.g., summer months) than it has during other months of the year. In this case, the resource usage prediction 232 that is generated for the deployment grain 224 can differ greatly depending on which months of the year are included in the upcoming time period for which the resource usage prediction 232 is generated.

In some embodiments, one or more aspects of the predicted deployed resources signal 212 can be generated using machine learning-driven forecasts. For example, resource usage predictions 232 can be generated by applying machine learning models to historical data 234 (e.g., historical time series data) related to past resource consumption. FIG. 2 shows the historical data 234 being provided from one or more data stores 218. The historical data 234 can be provided to a capacity modeling engine 216. The capacity modeling engine 216 can be configured to generate the predicted deployed resources signal 212 based at least in part on the historical data 234.

The predicted deployed resources signal 212 enables resource usage predictions 232 to be identified in connection with specific deployment grains 224. Advantageously, this configuration reduces processing and memory requirements for a cloud computing capacity management system. Instead of having to compute resource usage predictions 232 on an as-needed basis, the resource usage predictions 232 can be pre-calculated and cached and then retrieved as needed.

Figure 3:
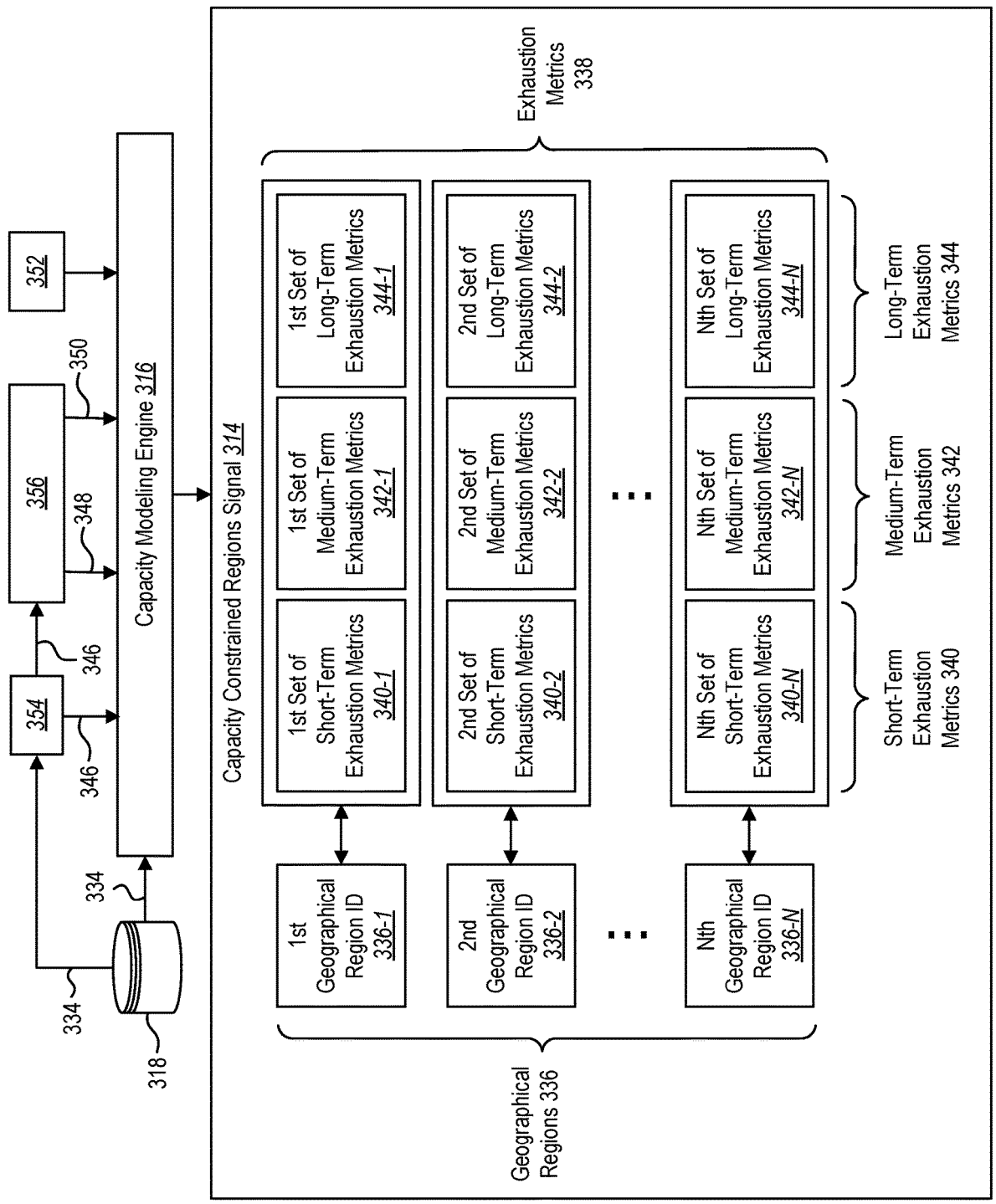
FIG. 3 illustrates an example of a capacity constrained regions signal in accordance with at least some embodiments of the present disclosure.

FIG. 3 illustrates an example of a capacity constrained regions signal 314 in accordance with at least some embodiments of the present disclosure. As noted above, a capacity constrained regions signal 314 can identify regions of the cloud computing system where demand is expected to exceed capacity (or come close to exceeding capacity) during a future time period.

The capacity constrained regions signal 314 can be generated based at least in part on capacity modeling. Cloud infrastructure capacity planning is a challenging problem given the multitude of workloads and hardware on a global scale. The goals of capacity modeling can include fulfilling users' workload demands regardless of the dynamics of requirements while maximizing capacity utilization, delivering desired quality of service (QoS), and providing an efficient cost of goods sold (COGS).

In some embodiments, the capacity constrained regions signal 314 can include various metrics that indicate how much time remains before demand exceeds capacity in various geographical regions 336 of the cloud computing system. Such metrics may be referred to herein as exhaustion metrics 338. An exhaustion metric 338 for a particular geographical region 336 can indicate how much time remains before demand exceeds capacity in that geographical region 336. An exhaustion metric 338 can be expressed in terms of any desired time period (e.g., an hours-to-exhaustion metric, a days-to-exhaustion metric, a weeks-to-exhaustion metric).

In some embodiments, exhaustion metrics 338 can be made available across different time horizons, such as short term (e.g., hourly for the next seven days), medium term (e.g., weekly for the next three months), and even long term (e.g., a year out). FIG. 3 shows a plurality of different exhaustion metrics 338 that can be generated for a plurality of different geographical regions 336 of a cloud computing system. In the depicted example, the exhaustion metrics 338 for a particular geographical region 336 include short-term exhaustion metrics 340, medium-term exhaustion metrics 342, and long-term exhaustion metrics 344.

For purposes of the present example, it will be assumed that the cloud computing system under consideration includes N geographical regions 336, where the value of N can be any positive integer. FIG. 3 shows a first set of short-term exhaustion metrics 340-1, a first set of medium-term exhaustion metrics 342-1, and a first set of long-term exhaustion metrics 344-1 associated with a first geographical region ID 336-1 corresponding to a first geographical region of the cloud computing system. FIG. 3 also shows a second set of short-term exhaustion metrics 340-2, a second set of medium-term exhaustion metrics 342-2, and a second set of long-term exhaustion metrics 344-2 associated with a second geographical region ID 336-2 corresponding to a second geographical region of the cloud computing system. In addition, FIG. 3 shows an $N^{th}$ set of short-term exhaustion metrics 340-N, an $N^{th}$ set of medium-term exhaustion metrics 342-N, and an $N^{th}$ set of long-term exhaustion metrics 344-N associated with an $N^{th}$ geographical region ID 336-N corresponding to an $N^{th}$ geographical region of the cloud computing system.

Various factors can be taken into consideration when generating exhaustion metrics 338. FIG. 3 shows the exhaustion metrics 338 being generated by a capacity modeling engine 316. As noted above, the capacity modeling engine 316 can be configured to analyze data contained in one or more data stores 318 in order to generate the exhaustion metrics 338. The data can include datasets from resource requests that have been submitted by users to the cloud computing system. In addition, FIG. 3 also shows the capacity modeling engine 316 taking into consideration additional information in connection with generating the exhaustion metrics 338. This additional information can include demand forecasts 346, current available capacity 348, predicted available capacity 350 in the future, and any region-specific constraints 352.

FIG. 3 shows various components that can be configured to produce the additional information that is analyzed to produce the exhaustion metrics 338. In particular, FIG. 3 shows a demand forecasting engine 354 that is configured to produce the demand forecasts 346. The demand forecasts 346 can be produced based at least in part on historical data 334 about cloud computing resources that have been consumed in the past. FIG. 3 also shows a prediction engine 356 that is configured to generate the predicted available capacity 350. The demand forecasts 346 can be provided to the prediction engine 356, and the prediction engine 356 can generate the predicted available capacity 350 based at least in part on the demand forecasts 346 and the current available capacity 348 of the cloud computing system.

FIG. 3 shows the demand forecasting engine 354 and the prediction engine 356 separately from the capacity modeling engine 316. In some embodiments, however, the demand forecasting engine 354 and/or the prediction engine 356 can be implemented as part of the capacity modeling engine 316.

The capacity constrained regions signal 314 can be used to predict which parts (e.g., geographical regions and/or zones) of the cloud computing system are running out of capacity for specific cloud computing resources. In some embodiments, these predictions can be based on customer specific deployment constraints (e.g., zonal, T2, ultra-SSD requirements). This can lead to a determination of the capacity resources gap that should be solved with fine-grained admission control and other mitigation actions.

The capacity constrained regions signal 314 enables administrators of a cloud computing system to quickly and easily identify regions of the cloud computing system where demand is expected to exceed capacity (or come close to exceeding capacity) during a future time period. Advantageously, the configuration of the capacity constrained regions signal 314 reduces processing and memory requirements for a cloud computing capacity management system. Instead of having to perform a series of resource-intensive computations to determine whether there is a capacity shortage, the exhaustion metrics 338 can be pre-calculated and retrieved on an as-needed basis.

Figure 4:
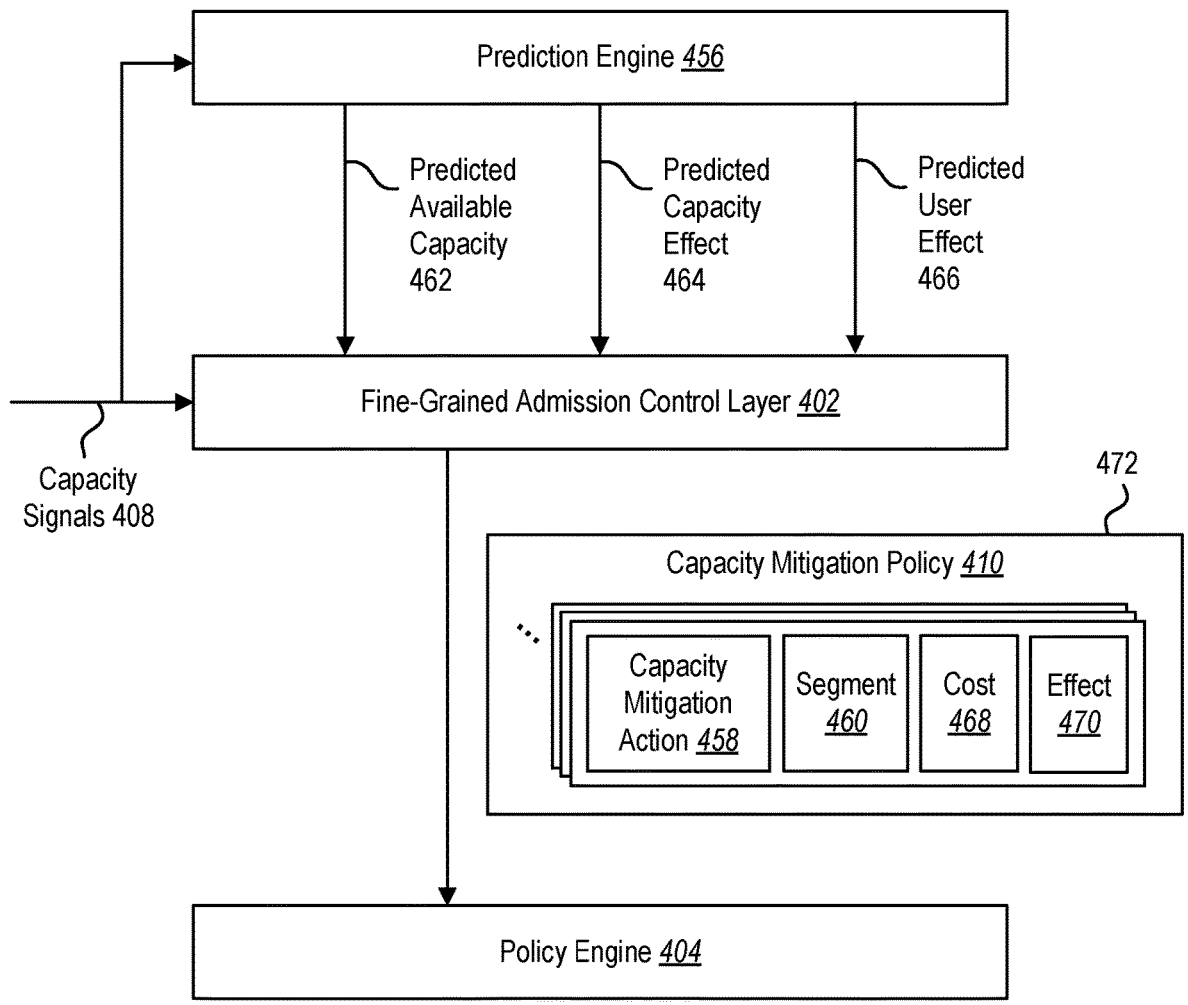
FIG. 4 illustrates an example showing how a capacity mitigation policy can be created in accordance with the present disclosure.

FIG. 4 illustrates an example showing certain aspects of the creation of a capacity mitigation policy 410 in accordance with the present disclosure. As discussed above, a fine-grained admission control layer 402 can be configured to ingest capacity signals 408 and create one or more create capacity mitigation policies 410 based at least in part on the capacity signals 408. In some embodiments, the fine-grained admission control layer 402 can create a capacity mitigation policy 410 in response to detecting that the predicted demand for cloud computing resources in a particular geographical region of the cloud computing system exceeds the predicted available capacity for that geographical region of the cloud computing system during an upcoming time period. In some embodiments, this can be determined by analyzing the capacity constrained regions signal 114. When the fine-grained admission control layer 402 detects that a capacity mitigation policy 410 is needed, the fine-grained admission control layer 402 can create the capacity mitigation policy 410 and feed the capacity mitigation policy 410 to the policy engine 404, which controls how the capacity mitigation policy 410 is applied to the cloud computing system.

A capacity mitigation policy 410 can include one or more capacity mitigation actions 458. There are many different types of capacity mitigation actions 458 that can be created and applied in accordance with the present disclosure. In some embodiments, capacity mitigation actions 458 can include usage restrictions. The term "usage restriction" can refer to any limitation on the usage of one or more segments 460 of the cloud computing system. In this context, the term "segment" 460 can refer to categories of users and/or categories of subscriptions.

In some embodiments, a usage restriction can limit the usage of a segment 460 of the cloud computing system based at least in part on the resource usage predictions 232 that are included in the predicted deployed resources signal 212 (as discussed above in connection with FIG. 2, for example). For example, a usage restriction can prevent a category of users and/or a category of subscriptions from consuming more cloud computing resources than they are predicted to consume based on the resource usage predictions 232 (which, as discussed above, can be based on historical data 234).

In some embodiments, at least some of the users of a cloud computing system can be prioritized. In a simple example, a subset of the total number of users of the cloud computing system can be designated as high-priority users. In the example related to the COVID-19 crisis that was discussed previously, first responders could be considered to be high priority users. As another example, a public cloud computing provider could prioritize paying customers above non-paying customers. Of course, there are many other ways in which users can be prioritized. In some embodiments, more than two levels of priority can be provided. For example, users could be classified a high priority, normal priority, or low priority.

In some embodiments, priorities can be associated with users, and all of the subscriptions corresponding to a particular user can be associated with the priority level that belongs to that user. For example, all of the subscriptions owned by a high-priority user could be considered to be high-priority subscriptions. Alternatively, in some embodiments different subscriptions corresponding to the same user can be associated with different priorities.

The capacity mitigation policies 410 generated by the fine-grained admission control layer 402 can be designed to protect available capacity of the cloud computing system for prioritized users and/or prioritized subscriptions. In other words, the capacity mitigation policies 410 can be designed so as to minimize the extent to which high-priority users and/or high-priority subscriptions are affected by any capacity mitigation actions 458 (i.e., actions that are taken to restrict demand for cloud computing services) implemented by the capacity management system.

Ideally, a capacity mitigation policy 410 can be designed so that high-priority users are not affected at all by any capacity mitigation actions 458 that are specified by the capacity mitigation policy 410. If that level of protection is not possible or feasible, a capacity mitigation policy 410 can be designed so that high-priority users are not affected as much as lower priority users are by any capacity mitigation actions 458 that are specified by the capacity mitigation policy 410.

Under some circumstances, capacity mitigation policies 410 can be designed to protect specific users and/or specific subscriptions. Under other circumstances, capacity mitigation policies 410 can be designed to protect categories of users and/or categories of subscriptions.

In some embodiments, the fine-grained admission control layer 402 can provide capacity mitigation policies 410 to the policy engine 404 on a dynamic basis based at least in part on the capacity signals 408 discussed previously (e.g., the predicted deployed resources signal 212 and the capacity constrained regions signal 314). Alternatively, in other embodiments, the fine-grained admission control layer 402 can periodically provide capacity mitigation policies 410 to the policy engine 404. Capacity mitigation policies 410 can be created and updated in real time.

In some embodiments, the fine-grained admission control layer 402 can be configured to create a capacity mitigation policy 410 based at least in part on several additional inputs besides the capacity signals 408 themselves. These additional inputs can include the predicted available capacity 462 for a given scope of the cloud computing system, a predicted capacity effect 464, and a predicted user effect 466.

The predicted available capacity 462 can include a prediction about how much available capacity there will be in the cloud computing system during an upcoming time period. The predicted available capacity 462 can be determined based at least in part on the capacity constrained regions signal 314. The predicted available capacity 462 can be determined for any desired parts (e.g., geographical regions) of the cloud computing system.

The predicted capacity effect 464 can include one or more predictions about how the capacity mitigation policy 410 will affect the predicted available capacity 462 of the cloud computing system. For example, the predicted capacity effect 464 can include predictions about how much capacity can be obtained by implementing certain capacity mitigation actions 458 (e.g., usage restrictions on certain segments 460 of the cloud computing system) that are specified by the capacity mitigation policy 410.

The predicted user effect 466 can include one or more predictions about how the capacity mitigation policy 410 will affect at least some of the users of the cloud computing system. Restrictions on demand can have some sort of an effect on at least some users, and the predicted user effect 466 can include metrics that quantify this effect so that the policy engine 404 can balance cost/benefit aspects when applying and removing capacity mitigation actions 458 (as will be discussed in greater detail below).

FIG. 4 shows a prediction engine 456 that is configured to generate the inputs that are provided to the fine-grained admission control layer 402 in connection with the creation of the capacity mitigation policy 410. In FIG. 4, the prediction engine 456 is shown as being separate from the fine-grained admission control layer 402. In an alternative embodiment, however, the prediction engine 456 can be implemented as part of the fine-grained admission control layer 402.

The fine-grained admission control layer 402 can be configured to determine the following information about each capacity mitigation action 458 that is included in a capacity mitigation policy 410: a segment 460 of the cloud computing system to which the capacity mitigation action 458 should be applied, the cost 468 of the capacity mitigation action 458, and the effect 470 of the capacity mitigation action 458 on the predicted available capacity 462 of the cloud computing system. The cost 468 of the capacity mitigation action 458 can include one or more metrics that indicate the extent to which the capacity mitigation action 458 will affect the segment 460 to which the capacity mitigation action 458 will be applied. The cost 468 of the capacity mitigation action 458 can be influenced at least in part by the predicted user effect 466. The effect 470 of the capacity mitigation action 458 can include one or more metrics that indicate the extent to which the capacity mitigation action 458 will increase the predicted available capacity 462 of the cloud computing system. The effect 470 of the capacity mitigation action 458 can be influenced at least in part by the predicted capacity effect 464. Information about the cost 468 and the effect 470 of the capacity mitigation actions 458 associated with a capacity mitigation policy 410 can be stored in one or more data structures 472.

Below is a table that represents an example of a data structure 472 that can store the information that is determined about the capacity mitigation actions 458 in a capacity mitigation policy 410.

| Capacity mitigation action | Segment | Cost | Effect |
| --- | --- | --- | --- |
| Usage based | Trial | 10 | +1000 cores |
| Total block | Trial | 15 | +600 cores |
| Usage based | Enterprise | 20 | +500 cores |

The table shown above includes two different examples of capacity mitigation actions 458. These capacity mitigation actions 458 are referred to as a usage based capacity mitigation action 458 and a total block capacity mitigation action 458. The usage based capacity mitigation action 458 can denote an action to restrict the usage of one or more segments 460 of the cloud computing system. The total block capacity mitigation action 458 can denote an action to completely block the usage of one or more segments 460 of the cloud computing system.

The table shown above also includes two different examples of segments 460. These segments 460 are referred to as a trial segment 460 and an enterprise segment 460. The trial segment 460 can include non-paying subscriptions. Such subscriptions may be provided to potential customers in order to give them a chance to evaluate the services offered by the cloud computing system for a temporary period of time. In contrast, the enterprise segment 460 can denote subscriptions owned by enterprises (e.g., businesses, schools, non-profit organizations). The enterprise segment 460 can include paying subscriptions.

Of course, there are many other kinds of capacity mitigation actions 458 that can be performed in accordance with the present disclosure. There are also many other kinds of segments 460 to which the capacity mitigation actions 458 can be applied. Some other examples of capacity mitigation actions 458 include evictions, quota controls, and capacity buildout actions.

The above example illustrates that a capacity mitigation policy 410 in accordance with the present disclosure can include a plurality of different capacity mitigation actions 458 that can be applied to a plurality of different segments 460 of the cloud computing system.

The table shown above also includes, for each capacity mitigation action 458 that is applied to a particular segment 460, the cost 468 of the capacity mitigation action 458. As shown above, the cost 468 of the capacity mitigation action 458 can be expressed in terms of a numerical metric. In this example, a higher numerical value indicates that a capacity mitigation action 458 has more of an impact on the affected segment 460 of the cloud computing system than a lower numerical value. Thus, in this example, the usage-based capacity mitigation action 458 applied to a trial segment 460 of the cloud computing system (which has a cost of 10) is less costly than the usage-based capacity mitigation action 458 applied to an enterprise segment 460 of the cloud computing system (which has a cost of 20).

The table shown above also includes, for each capacity mitigation action 458 that is applied to a particular segment 460, the effect 470 of the capacity mitigation action 458. In this example, the effect 470 of the capacity mitigation action 458 can be expressed in terms of the number of additional cores (e.g., physical and/or virtual CPU cores) that are expected to become available as a result of the capacity mitigation action 458. Thus, in this example, the usage-based capacity mitigation action applied to a trial segment of the cloud computing system (which causes an additional 1000 cores to become available) has a greater benefit than the usage-based capacity mitigation action applied to an enterprise segment of the cloud computing system (which only causes an additional 500 cores to become available).

As discussed above, the policy engine 404 controls how a capacity mitigation policy 410 generated by the fine-grained demand control layer is applied to the cloud computing system. The policy engine 404 can apply a capacity mitigation policy 410 to the cloud computing system so as to cause capacity mitigation actions 458 to be performed when capacity shortages are predicted to occur and to cause the capacity mitigation actions 458 to be undone when the capacity shortages are no longer predicted to occur.

Figure 5:
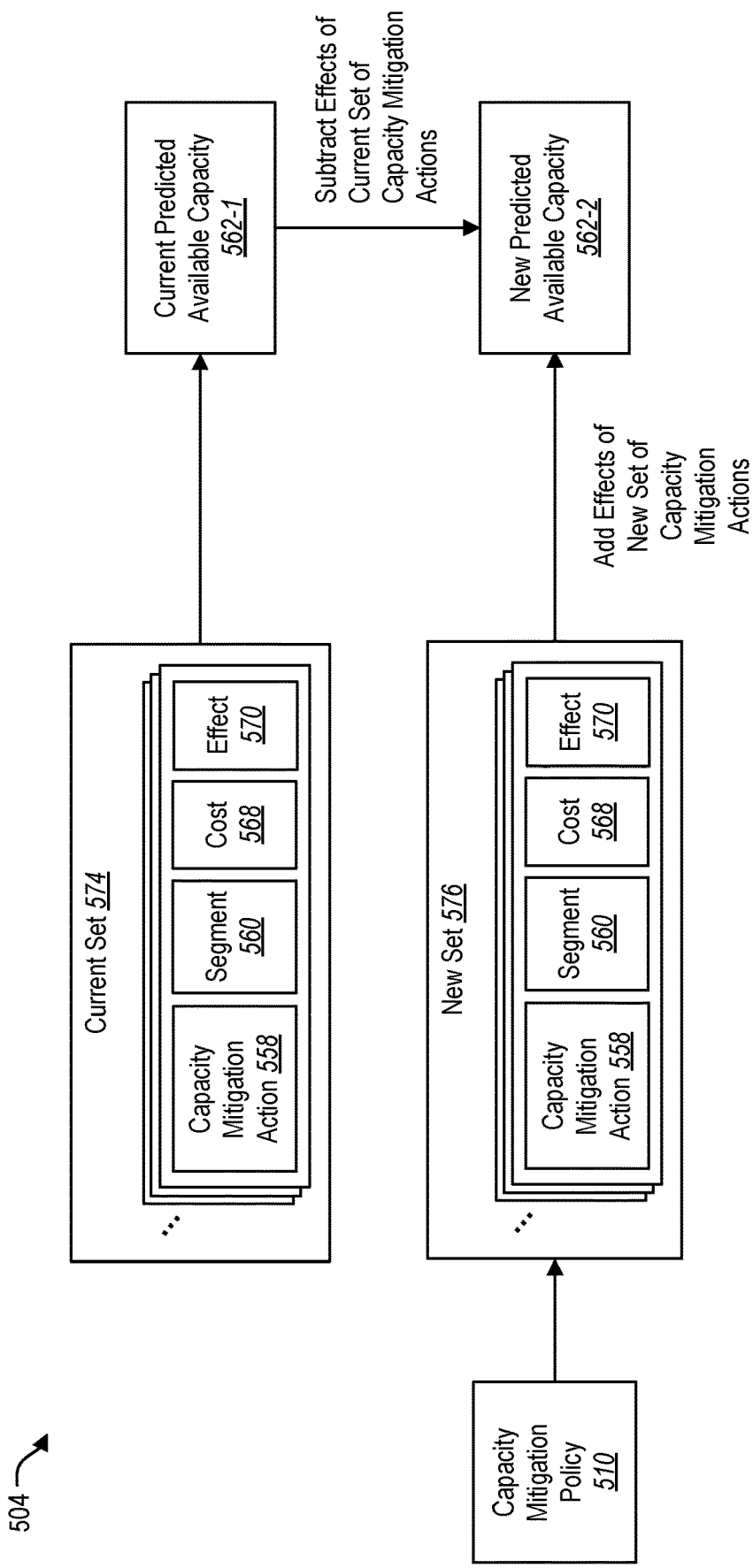
FIG. 5 illustrates an example showing how a policy engine can apply a capacity mitigation policy to a cloud computing system in accordance with at least some embodiments of the present disclosure.

FIG. 5 illustrates an example showing how a policy engine 504 can apply a capacity mitigation policy 510 to a cloud computing system. In some embodiments, the policy engine 504 can obtain the capacity mitigation actions 558 that are currently in effect. These capacity mitigation actions 558 may be referred to in the discussion that follows as a current set 574 of capacity mitigation actions 558. With the current set 574 of capacity mitigation actions 558 in effect, the cloud computing system has a current predicted available capacity 562-1.

Starting from the current predicted available capacity 562-1, the policy engine 504 can initially remove all capacity mitigation actions 558 by subtracting their effects 570 from the current predicted available capacity 562-1. This produces a new predicted available capacity 562-2.

The policy engine 504 can then create a new set 576 of capacity mitigation actions 558. This new set 576 of capacity mitigation actions 558 can initially be empty, and the policy engine 504 can add capacity mitigation actions 558 (from the capacity mitigation policy 510) to the new set 576 of capacity mitigation actions 558. As long as the predicted demand exceeds the new predicted available capacity 562-2, the policy engine 504 can continue to add capacity mitigation actions 558 until the new predicted available capacity 562-2 exceeds the predicted demand. In some embodiments, the capacity mitigation actions 558 can be added based on the order in which they occur in the capacity mitigation policy 510. The order in which the capacity mitigation actions 558 occur in the capacity mitigation policy 510 can depend on the cost 568 of the capacity mitigation actions 558 and/or their effect 570 on the cloud computing system. The cost 568 and/or the effect 570 of a capacity mitigation action 558 can be associated with a particular segment 560 of the cloud computing system.

Once the new predicted available capacity 562-2 exceeds the predicted demand, the new set 576 of capacity mitigation actions 558 can be synchronized with the current set 574 of capacity mitigation actions 558. If the new set 576 of capacity mitigation actions 558 (in its final state) is the same as the current set 574 of capacity mitigation actions 558, then no change needs to be made to the capacity mitigation actions 558 that are being applied to the cloud computing system. Otherwise, the capacity mitigation actions 558 that are being applied to the cloud computing system can be changed.

Under some circumstances, the new set 576 of capacity mitigation actions 558 can include additional capacity mitigation actions 558 that were not previously included in the current set 574 of capacity mitigation actions 558. In this case, the algorithm performed by the policy engine 504 can have the effect of applying additional capacity mitigation actions 558 to the cloud computing system that were not previously being performed.

Under some circumstances, the current set 574 of capacity mitigation actions 558 can include some capacity mitigation actions 558 that are not included in the new set 576 of capacity mitigation actions 558. In this case, the algorithm performed by the policy engine 504 can have the effect of removing some of the capacity mitigation actions 558 from the cloud computing system that were previously being performed.

In essence, the algorithm just described theorizes the removal of all current capacity mitigation actions 558 and adds them back according to the capacity mitigation policy

510. If the final mitigation state is the same as what is currently configured in the system, then there will be no change in the system. Otherwise, the policy engine 504 will synchronize the current system with the new list. In some cases, this will result in adding capacity mitigation actions 558 (e.g., when a gap is present) and in other cases in removing capacity mitigation actions 558 (e.g., when a surplus is present). In some embodiments, any existing capacity mitigation actions 558 can be lifted in a scenario where there is a surplus.

One benefit of the algorithm just described is that the algorithm is resilient to any initial mitigation state. This is because the algorithm does not attempt to understand the initial mitigation state. The algorithm also does not separate a gap scenario (where predicted demand exceeds predicted available capacity) and a surplus scenario (where predicted available capacity exceeds predicted demand) as two separate scenarios. Advantageously, having a unified approach to both situations (instead of requiring two separate algorithms for these two situations) reduces processing and memory requirements for a cloud computing capacity management system. Another advantage is that if two algorithms are used, there is always the risk that the final mitigation state depends on the algorithm used. When using just one algorithm, the final state only depends on the initial state (set of mitigations), making the system more predictable.

Figure 6:
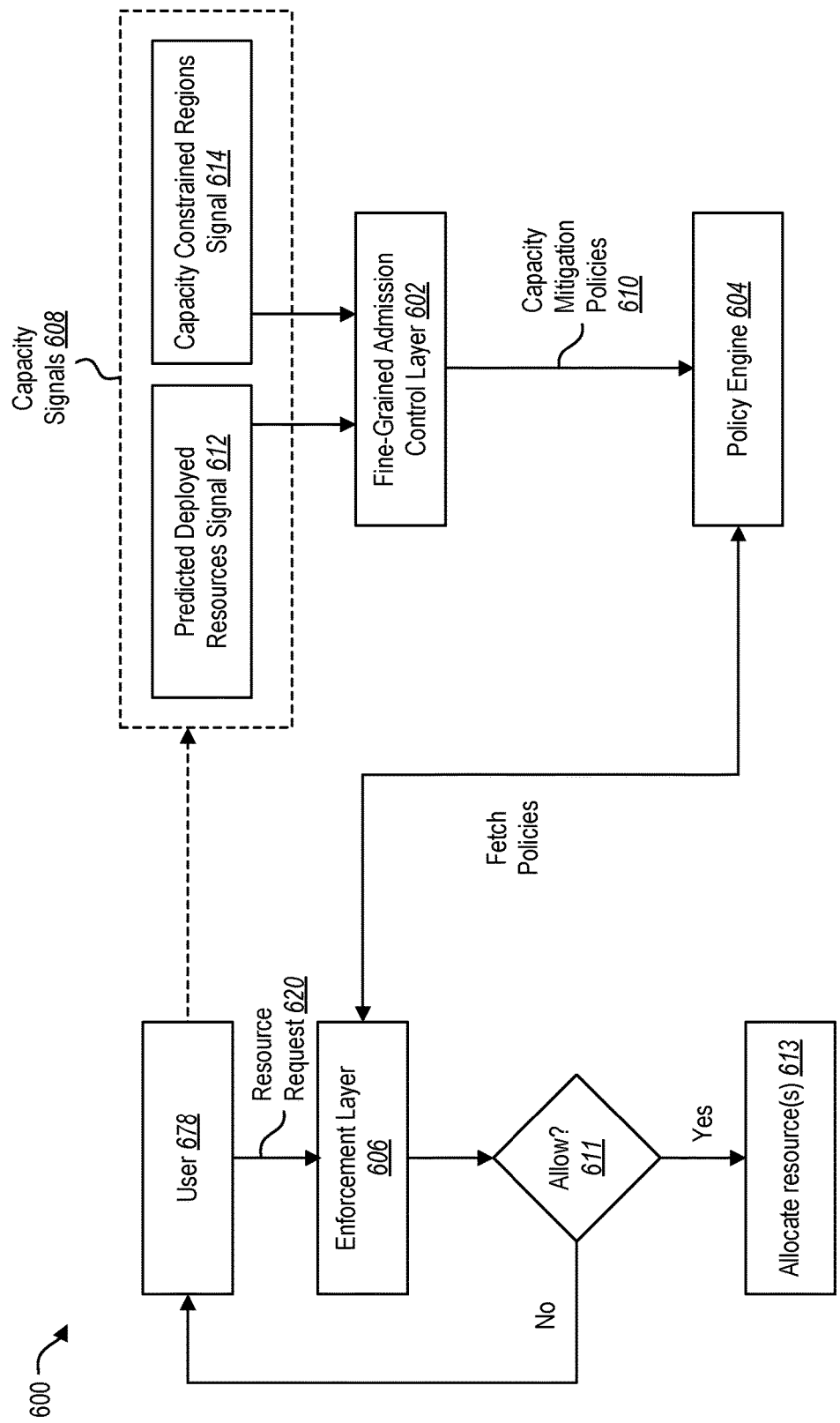
FIG. 6 illustrates an example showing potential interactions among a fine-grained admission control layer, a policy engine, and an enforcement layer in a cloud computing capacity management system in accordance with at least some embodiments of the present disclosure.

FIG. 6 illustrates an example showing potential interactions among a fine-grained admission control layer 602, a policy engine 604, and an enforcement layer 606 in a cloud computing capacity management system 600 in accordance with at least some embodiments of the present disclosure.

As discussed above, a fine-grained admission control layer 602 can be configured to ingest capacity signals 608 such as a predicted deployed resources signal 612 and a capacity constrained regions signal 614. Based on the capacity signals, the fine-grained admission control layer 602 can create one or more capacity mitigation policies 610 based at least in part on the capacity signals 608.

When a user 678 of the cloud computing system submits a resource request 620 (i.e., a request for resources of the cloud computing system to be deployed on behalf of the user 678), the resource request 620 can be processed by the enforcement layer 606. In response to receiving such a resource request 120, the enforcement layer 106 can fetch one or more capacity mitigation policies 610 from the policy engine 604 that could potentially affect the resource allocation that is being requested.

If there is nothing in the capacity mitigation policies 610 that would prevent the resource request 620 from being fulfilled, then the enforcement layer 106 can decide 611 to allow the request and allocate 613 the requested cloud computing resources. On the other hand, if the capacity mitigation policies 610 indicate that the resource request 620 should not be fulfilled (either wholly or in part, as discussed above), then the enforcement layer 606 can decide 611 to decline the resource request 620 (either wholly or in part). The enforcement layer 606 can also provide a notification message to the user 678 indicating the reason for declining the resource 620.

Figure 7:
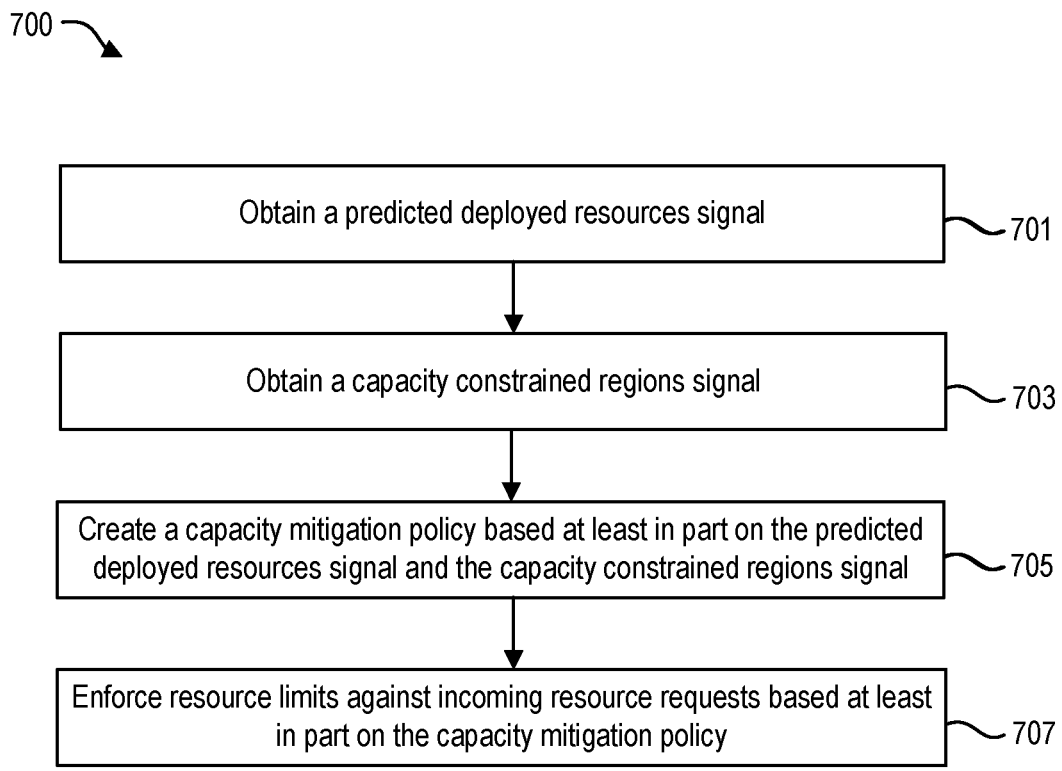
FIG. 7 illustrates an example of a method for automated fine-grained admission control that can be implemented by a fine-grained admission control layer, a policy engine, and an enforcement layer in accordance with at least some embodiments of the present disclosure.

FIG. 7 illustrates an example of a method 700 for automated fine-grained admission control in accordance with at least some embodiments of the present disclosure. For the sake of clarity, the method 700 will be described in relation to the various examples of cloud computing capacity management systems described herein. In some embodiments, the method 700 shown in FIG. 7 can be implemented by a fine-grained admission control layer, a policy engine, and an enforcement layer in accordance with at least some embodiments of the present disclosure.

The method 700 can include obtaining 701 a predicted deployed resources signal 212. As discussed above, the predicted deployed resources signal 212 can include a plurality of different resource usage predictions 232 corresponding to a plurality of different deployment grains 224. A resource usage prediction 232 for a deployment grain 224 can include a prediction about an amount of cloud computing resources that will be consumed by the deployment grain 224 during an upcoming time period.

The method 700 can also include obtaining 703 a capacity constrained regions signal 314. The capacity constrained regions signal 314 can identify regions of the cloud computing system where demand is expected to exceed capacity at a future point in time.

The method 700 can also include creating 705 a capacity mitigation policy 110 based at least in part on the predicted deployed resources signal 212 and the capacity constrained regions signal 314. The capacity mitigation policy 110 can be designed to protect available capacity of the cloud computing system for prioritized users.

The method 700 can also include enforcing 707 resource limits against incoming resource requests 120 based on the capacity mitigation policy 110. In some embodiments, when a resource request 120 is received, the capacity mitigation policy 110 can be checked to determine whether the capacity mitigation policy 110 specifies any capacity mitigation actions 558 that would affect fulfillment of the resource request 120. If so, then the fulfillment of the resource request 120 can be delayed, denied, or otherwise altered based on the capacity mitigation policy 110.

Figure 8:
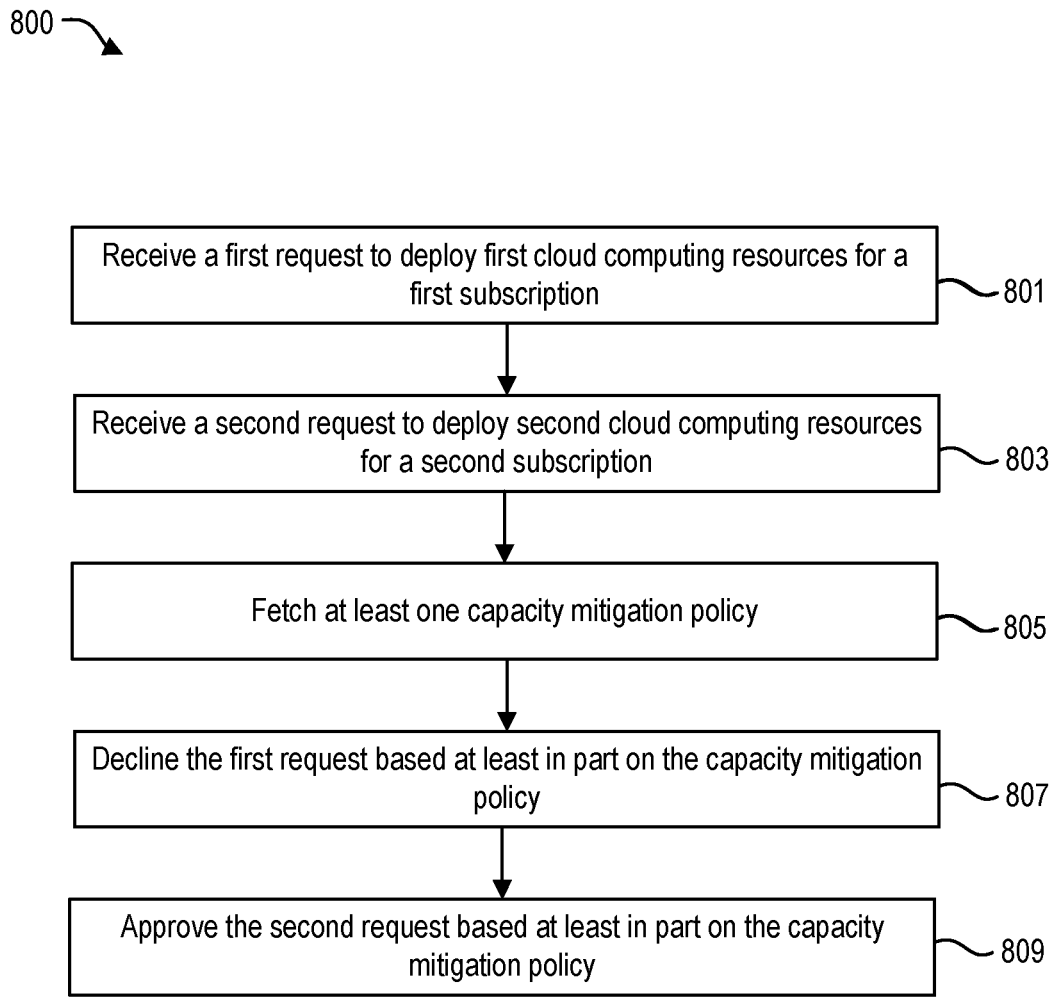
FIG. 8 illustrates an example of a method for automated fine-grained admission control that can be implemented by an enforcement layer in accordance with at least some embodiments of the present disclosure.

FIG. 8 illustrates another example of a method 800 for automated fine-grained admission control in accordance with at least some embodiments of the present disclosure. As before, the method 800 will be described in relation to the various examples of cloud computing capacity management systems described herein.

The method 800 can include receiving 801, at an enforcement layer 106 of a cloud computing system, a first request 120 to deploy first cloud computing resources for a first subscription corresponding to the cloud computing system. The method 800 can also include receiving 803, at the enforcement layer 106 of the cloud computing system, a second request 120 to deploy second cloud computing resources for a second subscription corresponding to the cloud computing system. In some embodiments, both the first request 120 and the second request 120 can be directed to cloud computing resources within the same geographical region of the cloud computing system. In some embodiments, both the first request 120 and the second request 120 can be received within a certain time period (e.g., within the same day, within the same hour).

The method 800 can also include fetching 805 at least one capacity mitigation policy 110 from a policy engine 104 of the cloud computing system. As discussed above, the capacity mitigation policy 110 can be designed to protect available capacity of the cloud computing system for prioritized users. For purposes of the present method 800, it will be assumed that the capacity mitigation policy 110 includes at least one capacity mitigation action 558 that affects the first subscription, and also that the capacity mitigation policy 110 does not include any capacity mitigation actions 558 that affect the second subscription.

Because the capacity mitigation policy 110 includes at least one capacity mitigation action 558 that affects the first subscription, the method 800 can include declining 807 the first request 120 based at least in part on the capacity mitigation policy 110. In some embodiments, declining 807 the first request 120 can include refusing to deploy the first cloud computing resources. Alternatively, declining 807 the first request 120 can include delaying deployment of the first cloud computing resources, or taking some other action that changes deployment of the first cloud computing resources relative to what was requested.

However, because the capacity mitigation policy 110 does not include any capacity mitigation actions 558 that affect the second subscription, the method 800 can also include approving 809 the second request 120 based at least in part on the capacity mitigation policy 110. Approving 809 the second request 120 can include deploying the second cloud computing resources.

Figure 9:
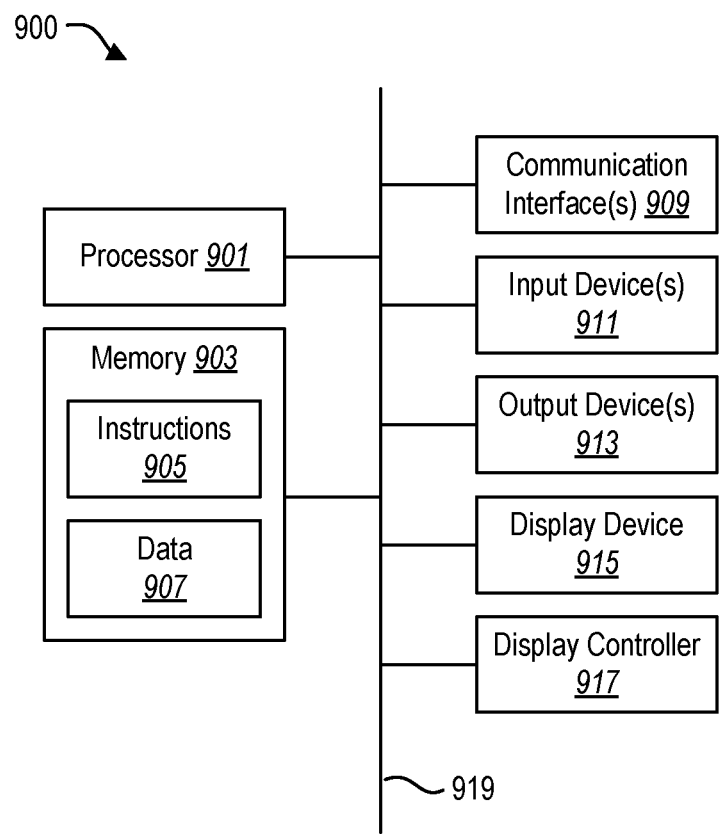
FIG. 9 illustrates certain components that can be included within a computing device that can be used to implement at least some aspects of the present disclosure.

Reference is now made to FIG. 9. One or more computing devices 900 can be used to implement at least some aspects of the techniques disclosed herein. FIG. 9 illustrates certain components that can be included within a computing device 900.

The computing device 900 includes a processor 901 and memory 903 in electronic communication with the processor 901. Instructions 905 and data 907 can be stored in the memory 903. The instructions 905 can be executable by the processor 901 to implement some or all of the methods, steps, operations, actions, or other functionality that is disclosed herein. Executing the instructions 905 can involve the use of the data 907 that is stored in the memory 903. Unless otherwise specified, any of the various examples of modules and components described herein can be implemented, partially or wholly, as instructions 905 stored in memory 903 and executed by the processor 901. Any of the various examples of data described herein can be among the data 907 that is stored in memory 903 and used during execution of the instructions 905 by the processor 901.

Although just a single processor 901 is shown in the computing device 900 of FIG. 9, in an alternative configuration, a combination of processors (e.g., an ARM and DSP) could be used.

The computing device 900 can also include one or more communication interfaces 909 for communicating with other electronic devices. The communication interface(s) 909 can be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 900 can also include one or more input devices 911 and one or more output devices 913. Some examples of input devices 911 include a keyboard, mouse, microphone, remote control device, button, joystick, trackball, touchpad, and lightpen. One specific type of output device 913 that is typically included in a computing device 900 is a display device 915. Display devices 915 used with embodiments disclosed herein can utilize any suitable image projection technology, such as liquid crystal display (LCD), light-emitting diode (LED), gas plasma, electroluminescence, or the like. A display controller 917 can also be provided, for converting data 907 stored in the memory 903 into text, graphics, and/or moving images (as appropriate) shown on the display device 915. The computing device 900 can also include other types of output devices 913, such as a speaker, a printer, etc.

The various components of the computing device 900 can be coupled together by one or more buses, which can include a power bus, a control signal bus, a status signal bus, a data bus, etc. For the sake of clarity, the various buses are illustrated in FIG. 9 as a bus system 919.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

As an example, the term "circuitry" can refer to one or more integrated circuits, where an integrated circuit can include a set of electronic circuits on a piece of semiconductor material (e.g., silicon). In some embodiments, circuitry can include programmable logic devices such as field programmable gate arrays (FPGAs) and/or complex programmable logic devices (CPLDs). In some embodiments, circuitry can include application specific integrated circuits (ASICs). As another example, the term "circuitry" can refer to one or more discrete electronic circuits that include individual electronic components. As another example, the term "circuitry" can refer to a digital circuit, an analog circuit, or a mixed-signal circuit. "Circuitry" can also include combinations of the foregoing.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A cloud computing capacity management system, comprising:
   one or more processors;
   a prediction engine configured to generate one or more capacity signals;
   a fine-grained admission control layer that is executable by the one or more processors to ingest the capacity signals and create a capacity mitigation policy, based at least in part on the capacity signals, to protect available capacity of a cloud computing system, wherein the capacity mitigation policy is directed to a deployment grain, the deployment grain indicating a subscriber identifier and a resource identifier associated with a set of one or more users of the cloud computing system;
   a policy engine that is executable by the one or more processors to control how the capacity mitigation policy is applied to the set of one or more users of the deployment grain in order to cause one or more capacity mitigation actions to be performed when capacity shortages are predicted and to undo the one or more capacity mitigation actions when the capacity shortages are no longer predicted;
   an enforcement layer that is executable by the one or more processors to handle incoming resource requests from the set of one or more users associated with the deployment grain and to enforce resource limits based on the capacity mitigation policy as applied by the policy engine; and
   a manual override lever for managing extraneous situations outside of intelligence provided by the prediction engine to update the capacity mitigation policy.

2. The cloud computing capacity management system of claim 1, wherein the capacity signals comprise:
   a predicted deployed resources signal that comprises a plurality of different resource usage predictions corresponding to a plurality of different deployment grains, wherein a resource usage prediction for a deployment grain predicts an amount of cloud computing resources that will be consumed by the deployment grain in an upcoming time period; and
   a capacity constrained regions signal that identifies regions of the cloud computing system where demand is expected to exceed capacity at a future point in time.

3. The cloud computing capacity management system of claim 2, wherein at least some of the plurality of different deployment grains correspond to a same subscription for the cloud computing system.

4. The cloud computing capacity management system of claim 2, wherein the resource usage prediction for the deployment grain is generated based on historical data about cloud computing resources that have been consumed by that deployment grain in the past.

5. The cloud computing capacity management system of claim 2, wherein the capacity constrained regions signal comprises exhaustion metrics that indicate how much time remains before demand exceeds capacity in various geographical regions of the cloud computing system.

6. The cloud computing capacity management system of claim 1, wherein:
   the capacity signals comprise a capacity constrained regions signal that identifies regions of the cloud computing system where demand is expected to exceed capacity at a future point in time; and
   the fine-grained admission control layer updates an existing capacity mitigation policy for the deployment grain based at least in part on the capacity constrained regions signal indicating that the demand is expected to exceed capacity at the future point in time.

7. The cloud computing capacity management system of claim 1, wherein the deployment grain additionally indicates a geographic identifier associated with a geographical region, wherein the fine-grained admission control layer creates the capacity mitigation policy in response to detecting that a predicted demand for cloud computing resources in the geographical region of the deployment grain on the cloud computing system exceeds a predicted available capacity for that geographical region of the cloud computing system during an upcoming time period.

8. The cloud computing capacity management system of claim 1, wherein:
   the capacity signals comprise a plurality of different resource usage predictions corresponding to a plurality of different deployment grains;
   a resource usage prediction for a deployment grain predicts an amount of cloud computing resources that will be consumed by the deployment grain in an upcoming time period;
   the capacity mitigation policy comprises usage restrictions based on the plurality of different resource usage predictions;
   the usage restrictions comprise thresholds for limiting usage of deployment grains when the cloud computing system is experiencing capacity shortages; and
   a usage restriction corresponding to a particular deployment grain comprises a limit on the usage of the particular deployment grain based at least in part on the resource usage prediction that has been calculated for the particular deployment grain.

9. The cloud computing capacity management system of claim 1, wherein the fine-grained admission control layer creates the capacity mitigation policy based at least in part on:
   a predicted capacity effect that predicts how the capacity mitigation policy will affect a predicted available capacity of the cloud computing system; and a predicted user effect that predicts how the capacity mitigation policy will affect at least some of the users of the cloud computing system.

10. The cloud computing capacity management system of claim 1, wherein the capacity mitigation policy comprises a plurality of different capacity mitigation actions that are applied to different segments of the cloud computing system.

11. The cloud computing capacity management system of claim 1, wherein the capacity mitigation policy comprises a plurality of capacity mitigation actions, and wherein the fine-grained admission control layer determines, for each capacity mitigation action:
 a segment of the cloud computing system to which the capacity mitigation action should be applied;
 a cost of the capacity mitigation action; and
 an effect of the capacity mitigation action on the available capacity of the cloud computing system.

12. The cloud computing capacity management system of claim 1, wherein the policy engine is additionally executable by the one or more processors to:
 obtain a current set of capacity mitigation actions and a current predicted available capacity;
 subtract effects of the current set of capacity mitigation actions from the current predicted available capacity to produce a new predicted available capacity;
 when the new predicted available capacity exceeds a predicted demand, remove existing capacity mitigation actions; and
 when the predicted demand exceeds the new predicted available capacity, add new capacity mitigation actions based on the capacity mitigation policy until the new predicted available capacity exceeds the predicted demand.

13. The cloud computing capacity management system of claim 1, further comprising a plurality of fine-grained admission control layers that are replicated across a plurality of different geographical regions.

14. The cloud computing capacity management system of claim 1, wherein:
 the capacity signals comprise a predicted deployed resources signal that comprises a plurality of different resource usage predictions corresponding to a plurality of different deployment grains; and
 the fine-grained admission control layer creates the capacity mitigation policy based at least in part on a cached version of the predicted deployed resources signal.

15. A method for automated fine-grained admission control for a cloud computing system, comprising:
 obtaining a predicted deployed resources signal that comprises a plurality of different resource usage predictions corresponding to a plurality of different deployment grains, each deployment grain of the plurality of different deployment grains including a combination of a subscriber identifier, a resource identifier, and a geographic identifier associated with a set of one or more users of the cloud computing system, wherein a resource usage prediction for a deployment grain from the plurality of different deployment grains predicts an amount of cloud computing resources that will be consumed by the deployment grain in an upcoming time period;
 obtaining a capacity constrained regions signal that identifies regions of the cloud computing system where demand is expected to exceed capacity at a future point in time;
 creating a capacity mitigation policy based on the predicted deployed resources signal, the capacity constrained regions signal, a predicted capacity effect associated with an estimated effect on availability of computing resources for the deployment grain as a result of the capacity mitigation policy being applied to the deployment grain, and a predicted user effect associated with an estimated effect on at least some of the users of the cloud computing system as a result of the capacity mitigation policy being applied to the deployment grain, wherein the capacity mitigation policy protects available capacity of the cloud computing system for one or more users associated with the deployment grain; and
 enforcing resource limits against incoming resource requests from the one or more users associated with the deployment grain based on the capacity mitigation policy.

16. The method of claim 15, wherein the resource usage prediction for the deployment grain is generated based on historical data about cloud computing resources that have been consumed by that deployment grain in the past.

17. The method of claim 15, wherein the capacity mitigation policy is created in response to detecting, based at least in part on the capacity constrained regions signal, that a predicted demand for cloud computing resources in a geographical region of the cloud computing system exceeds a predicted available capacity for that geographical region of the cloud computing system during the upcoming time period.

18. The method of claim 15, wherein the capacity mitigation policy comprises a plurality of different capacity mitigation actions that are applied to different segments of the cloud computing system.

19. A system, comprising:
 at least one processor;
 memory in electronic communication with the at least one processor; and
 instructions stored in the memory, the instructions being executable by the at least one processor to:
  obtain a predicted deployed resources signal that comprises a plurality of different resource usage predictions corresponding to a plurality of different deployment grains, each deployment grain of the plurality of different deployment grains including a combination of a subscriber identifier and a resource identifier, and a geographic identifier associated with a set of one or more users of the cloud computing system, wherein a resource usage prediction for a deployment grain from the plurality of different deployment grains predicts an amount of cloud computing resources that will be consumed by the deployment grain in an upcoming time period;
  obtain a capacity constrained regions signal that identifies regions of the cloud computing system where demand is expected to exceed capacity at a future point in time;
  create a capacity mitigation policy based on the predicted deployed resources signal, the capacity constrained regions signal, a predicted capacity effect associated with an estimated effect on available capacity of computing resources for the deployment grain as a result of the capacity mitigation policy being applied to the deployment grain, and a predicted user effect associated with an estimated effect on at least some of the users of the cloud computing system as a result of the capacity mitigation policy being applied to the deployment grain, wherein the capacity mitigation policy protects available capacity of the cloud computing system for one or more users associated with the deployment grain; and
resource limits against incoming resource requests from the one or more users associated with the deployment grain based on the capacity mitigation policy.

* * * * *